United States Patent
Ludwig et al.

(10) Patent No.: US 9,599,156 B2
(45) Date of Patent: Mar. 21, 2017

(54) SLEEVE BEARING

(71) Applicants: BOGE Elastmetall GmbH, Damme (DE); Audi AG, Ingolstadt (DE)

(72) Inventors: Volker Ludwig, Großenkneten (DE); Stefan Loheide, Wallenhorst (DE); Thomas Conrad, Treuchtlingen (DE)

(73) Assignees: BOGE ELASTMETALL GMBH, Damme (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/418,803

(22) PCT Filed: Jul. 1, 2013

(86) PCT No.: PCT/EP2013/063797
§ 371 (c)(1),
(2) Date: Jan. 30, 2015

(87) PCT Pub. No.: WO2014/019783
PCT Pub. Date: Feb. 6, 2014

(65) Prior Publication Data
US 2015/0226258 A1    Aug. 13, 2015

(30) Foreign Application Priority Data

Jul. 31, 2012 (DE) ................ 10 2012 213 440

(51) Int. Cl.
*F16F 1/38* (2006.01)
*F16C 33/04* (2006.01)
(Continued)

(52) U.S. Cl.
CPC ........... *F16C 33/046* (2013.01); *F16C 33/74* (2013.01); *F16F 13/1454* (2013.01)

(58) Field of Classification Search
CPC .... F16F 1/387; F16F 13/1409; F16F 13/1418; F16F 13/1427; F16F 13/1463
(Continued)

(56) References Cited

U.S. PATENT DOCUMENTS 2,621,923 A * 12/1952 Krotz ............... F16F 1/387
267/281
3,666,301 A * 5/1972 Jorn ............... F16F 1/387
267/282
(Continued)

FOREIGN PATENT DOCUMENTS

DE   10 2006 052 251 A1   5/2008
EP       0411997 A1       2/1991
(Continued)

OTHER PUBLICATIONS

International Search Report from co-pending PCT application No. PCT/EP2013/063797, issued Oct. 17, 2013.

*Primary Examiner* — Christopher Schwartz
(74) *Attorney, Agent, or Firm* — Cohen & Hildebrand, PLLC

(57) ABSTRACT

A sleeve bearing for being received in an outer sleeve includes an inner part which extends in the axial direction, a bearing body, and a cage which encloses the bearing body circumferentially. The bearing body encloses the inner part, is made from an elastic material, and has at least two chambers. The cage is formed from at least two cage parts, the spacing of which can be varied in the radial direction. A sealed joint area is provided between the cage parts.

10 Claims, 2 Drawing Sheets

(51) Int. Cl.
*F16F 13/14* (2006.01)
*F16C 33/74* (2006.01)

(58) Field of Classification Search
USPC .............. 267/140.11–140.13, 140.2–140.5, 267/141.1–141.7, 279–282
See application file for complete search history.

(56) References Cited

U.S. PATENT DOCUMENTS

| | | | |
|---|---|---|---|
| 4,877,262 A * | 10/1989 | Tanahashi | B60G 13/003 280/124.155 |
| 5,040,774 A | 8/1991 | Veverka et al. | |
| 5,054,752 A * | 10/1991 | Tabata | F16F 13/1463 180/312 |
| 5,088,702 A | 2/1992 | Thelamon et al. | |
| 5,397,112 A * | 3/1995 | Roth | F16F 13/14 267/140.12 |
| 7,306,211 B2 * | 12/2007 | Bjorkgard | B60G 7/005 267/141 |
| 7,441,759 B2 * | 10/2008 | Franke | F16F 1/3842 267/279 |
| 7,464,919 B2 * | 12/2008 | Hermann | B60G 15/068 267/141.7 |
| 2003/0201590 A1 * | 10/2003 | Thornhill | F16F 13/1427 267/140.12 |
| 2006/0006592 A1 | 1/2006 | Kato | |
| 2009/0200719 A1 * | 8/2009 | Kato | F16F 13/1427 267/140.12 |

FOREIGN PATENT DOCUMENTS

| | | |
|---|---|---|
| EP | 0641955 A1 | 3/1995 |
| FR | 2904075 A1 | 1/2008 |
| JP | H08177951 A | 7/1996 |

\* cited by examiner

SLEEVE BEARING

FIELD OF THE INVENTION

The present invention relates to a sleeve bearing for being received in an outer sleeve. Such sleeve bearings are generally known for the vibration-damping mounting of components, in particular via pins or shafts.

BACKGROUND OF THE INVENTION

The present invention relates in particular to a sleeve bearing having the features of the preamble of Claim 1. Such a sleeve bearing is known from DE 10 2006 052 251 A1. The sleeve bearing known from this publication has a bearing body made from an elastic material which receives an inner part in it which extends in the axial direction of the sleeve bearing. A fixing element of a machine part to be mounted elastically, in particular of a chassis component or of a drive unit, is received in this inner part. The previously known sleeve bearing is a hydrobushing and correspondingly has at least two chambers for receiving a damping means as well as a channel communicating with the two chambers, through which the hydraulic damping means can flow. Therein, a hydraulic damping occurs within the sleeve bearing by moving the hydraulic fluid from one chamber into another. This channel can be part of the sleeve bearing. The channel can, however, likewise be formed almost completely or partially by the outer sleeve, into which the sleeve bearing is inserted.

Furthermore, in the prior art of this type, a cage which encloses the bearing body is provided. This cage serves to stabilise the sleeve bearing and, in particular, to support the bearing body with respect to the outer sleeve which receives the sleeve bearing.

The installation of the sleeve bearing in the outer sleeve usually occurs with a certain compression. The stiffness and the service life of the sleeve bearing are influenced by this compression. In the case of the sleeve bearing known from prior art, the pressing of the sleeve bearing into the outer sleeve leads to a tension of the elastic material. In view of a service life that is as long as possible, the elastomer should not be exposed to tensile forces. Thus, occasionally it is endeavoured to impress a compressive stress into the bearing such that a certain compressive stress reservoir is provided in the sleeve bearing from the front therein. Meanwhile, high compressive forces also act on the cage and can deform this, which is undesirable. A deformation of the cage thus, in particular, leads to this losing its roundness. The compression is therein conveyed, as a rule, by the cage. Thus it is not possible to calibrate the damping properties of the sleeve bearing depending on direction.

SUMMARY OF THE INVENTION

The problem of the present invention is to specify a sleeve bearing of the type referred to at the beginning having increased service life.

For the solution of this problem, with the present invention the sleeve bearing referred to at the beginning is developed in that the cage is formed from at least two cage parts, the spacing of which is able to be varied in the radial direction, and that a joint area which is provided between the cage parts is sealed.

As in the prior art of this type, the cage also encloses the bearing body substantially circumferentially in the case of the sleeve bearing according to the invention. Therein the cage usually forms a contact surface for the support of the inner part on opposite sides. This contact surface is usually formed continuously on the cage in the axial direction and indeed on two surfaces which are usually opposite each other in a planar manner and extend in parallel to each other. The area lying therebetween is usually used for the formation of the chambers. Therein the chambers usually have windows which lie opposite each other and which are delimited axially by ring segment-shaped legs which are formed by the cage part(s). Using this ring segment-shaped leg, a sealing which is circumferential in a circumferential direction is formed on the sleeve bearing at the axial ends of the sleeve bearing such that this can be inserted into a bearing eye or a bearing sleeve, including the chambers.

The sleeve bearing according to the invention has the feature that the cage is formed at least from two cage parts, the radial spacing of which is able to be varied. Correspondingly, the spacing of the cage parts which form the cage can be varied during the installation of the same in a sleeve or a bearing eye and thus the sleeve bearing can be calibrated without the material forming the cage being exposed to excessive stress. Thus the stiffness of the sleeve bearing can be adjusted. Meanwhile, the service life of the sleeve bearing is improved as, in particular, the material forming the cage is not subjected to considerable internal stresses or deformations in the installation situation. Due to the separated cage, it is possible to an increased extent to put the elastomer under compressive stress such that this is also exposed to less strong potential tensile stresses even in the case of extreme deformations inside the elastomer bearing. The sleeve bearing correspondingly has an increased service life. Therein, a component which, as a rule, encloses the bearing body completely circumferentially, made from a stiffer material than the material forming the bearing body, is to be understood as a cage. The bearing body is preferably formed from elastomer. Aluminium, steel and/or plastic are preferred materials for the cage and the inner part.

In the case of the sleeve bearing according to the invention, however, the cage parts are sealed against each other in their joint area such that hydraulic fluid contained in the sleeve bearing which serves to dampen the bearing, cannot exit via the joint area.

The seal can therein be implemented in a different way. Thus, according to a preferred development of the present invention, it is proposed to connect the cage parts to each other via the material forming the bearing body, however also to hold them to be able to move relatively with respect to each other via this material. The elastic material is usually an elastomer which allows a certain mobility of the cage parts relative to each other due to its elastic properties. In the case of this embodiment, the cage is usually joined to a unit via the elastic material forming the bearing body. The individual cage parts cannot usually be handled separately.

In an alternative embodiment in which the cage parts are definitely still able to be handled as separate elements until the installation, at least one of the joint surfaces of the cage parts provided in the joint area is provided with a seal. In the installed state and after calibration of the sleeve bearing, this seal causes a sealing of the bearing parts in a liquid-tight manner in their joint area such that no hydraulic liquid can escape. The seal can therein be formed from the elastic material forming the bearing body, i.e. in particular an elastomer.

In an alternative embodiment, the joint area can also be sealed by a chamber cover covering the chamber. Usually, each chamber is covered and defined by a chamber cover in an axial direction. This chamber cover forms the sealing in the preferred embodiment. Therein it is indicated that the sealing of the cage parts must be formed, according to the present invention, at least in such a way that no damping means can escape from the chambers in the installed state. Consequently, in particular the sealing is significant for the sealing of the joint area in the present invention insofar as this occurs with respect to the chambers. Provided such a sealing is ensured in the installed state with respect to the chamber which contains the damping means, other segments of the joint area can definitely be implemented without sealing.

In the case of the development described above, the chamber cover is usually formed in a slotted manner in the joint area. The slot therein extends from the joint area radially inwards towards the inner part. The slot is, however, usually formed in this way only slightly in the chamber cover, and indeed in such a way that after the installation of the sleeve bearing, i.e. the calibration, the surfaces of the chamber cover which firstly delimit the slot are laid against each other or one on top of the other in a sealing manner. The sealing can therein also occur using a connection of the edges which delimit the slot, for example by adhering.

Finally, according to an alternative embodiment of the present invention, at least one sealing ring which encloses the cage on the outer circumference is proposed. This sealing ring usually encloses the cage formed from the cage parts completely circumferentially and seals the joint area on the outside. The sealing ring can be applied as a separate component and be connected to the cage in a positive and/or force-fit and/or firm manner. The connection can occur directly on the cage or indirectly on a cover which covers the cage. In the case of a positive connection, said sealing ring is usually arranged in a groove and between two radially circumferential annular protrusions of the cage.

According to a further preferred embodiment of the present invention, the bearing body is supported in the radial direction inside the bearing shells, ie. preferably in the previously gleaned base, and is exposed in the joint area of the cage parts opposite these shell-shapedcage parts. The joint area of the two cage parts therein usually lies centrally between the opposite contact surfaces of the bearing shells for the bearing body. The embodiment allows a bringing together of the cage parts during installation in the outer sleeve with manageable force expenditure. With increased compressive stress, the stiffness can be increased in the compression direction, i.e. the resistance of loads increases at a right angle on the contact surface, whereas the stiffness remains unchanged in the direction of thrust, i.e. in a direction at a right angle to the compression direction. Both the compression direction and the direction of thrust therein lie in a plane which is cut at a right angle by the longitudinal axis of the inner part. Correspondingly, it is a cross-sectional plane of the sleeve bearing.

According to a further preferred embodiment of the present invention, the cage parts form ring segment-shaped legs on opposite axial ends and at the height of the two chambers which lie opposite each other, said legs interacting in a sealing manner. The sealing occurs here with the view that the chambers are sealed in the joint area, i.e. on the free ends of the ring segment-shaped legs.

DETAILED DESCRIPTION OF THE FIGURES

Further details and advantages of the present invention result from the following description of an exemplary embodiment in connection with the drawing. Therein are shown:

Figure 1:
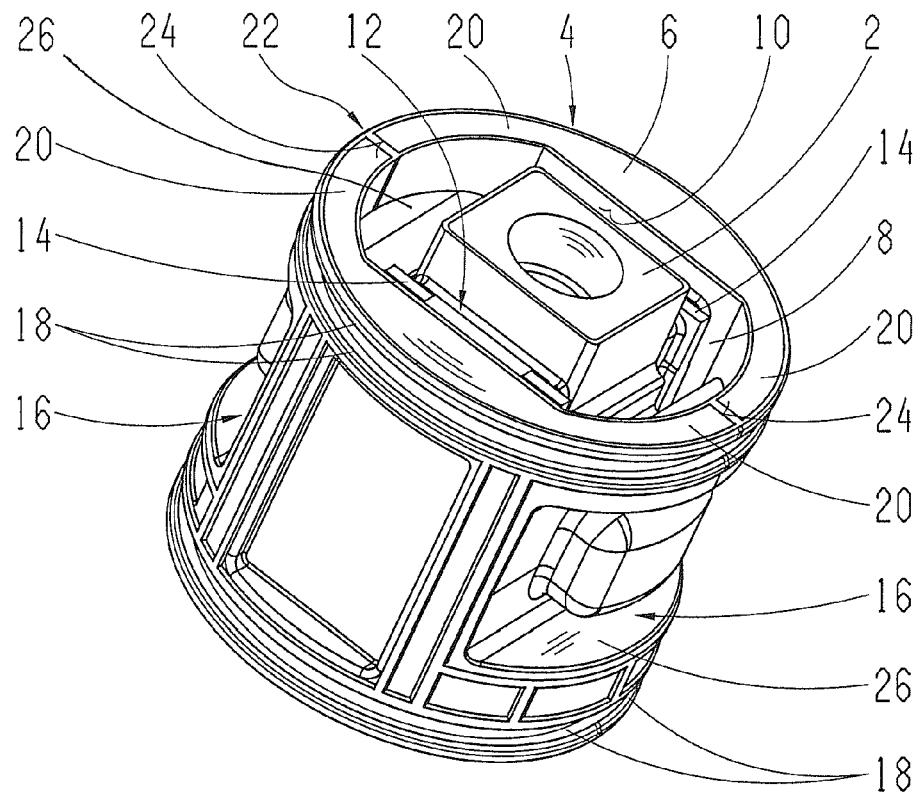
FIG. 1 is a perspective top view of a exemplary embodiment of the present invention.

The perspective depiction according to FIG. 1 allows the significant parts of the shown exemplary embodiment of a sleeve bearing to be recognised. This has an inner part identified with the reference numeral 2. This is a metallic component having a bore. This inner part 2 is enclosed completely circumferentially by a cage which is identified with the reference numeral 4. The cage 4 is formed from two cage shells 6, which are formed to be identical. The cage shells 6 form a flat contact surface 10 in their respective bases, identified with the reference numeral 8. Elastic material is vulcanised on this contact surface 10, said elastic material forming a bearing body 12 which is extended substantially between the flat contact surfaces 10 and the outer surfaces of the inner part 2. An intermediate sheet 14 is provided between the flat contact surfaces 10 and the outer surface of the inner part 2 which extends in parallel to this, and is vulcanised into the elastic material.

Figure 2:
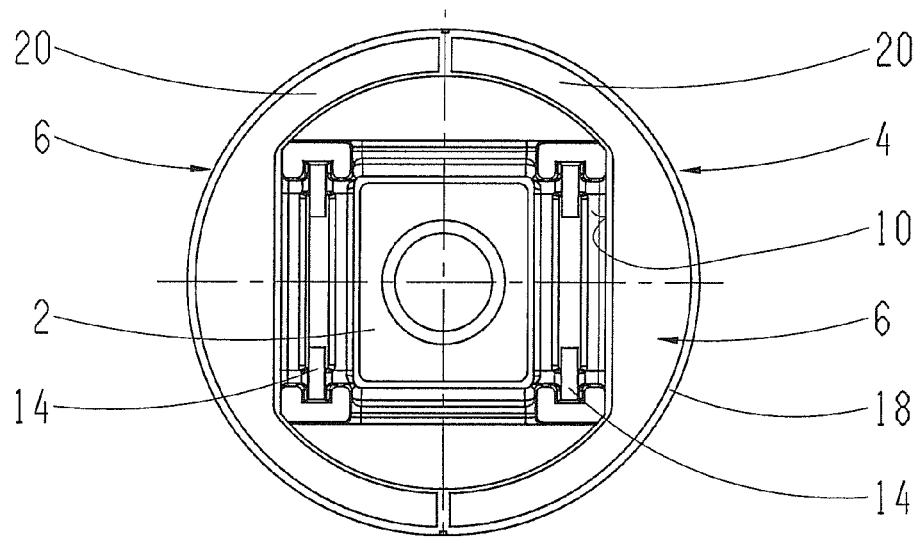
FIG. 2 is a top view of an exemplary embodiment of the present invention.

A chamber 16 is formed on the outer circumferential surface of the cage 4 on opposite circumferential sections respectively. Each chamber 16 is delimited in the axial direction on each of its axial ends by two circumferential sealing rings 18 respectively. These sealing rings 18 form the sealing on the outer side of the chamber 16 and of the sleeve bearing. The circumferential sealing rings 18 are in any case formed in the area of the chambers 16 on ring segment-shaped legs 20, which are each formed on the bearing shells 6 and which abut on each other in a sealing manner in a joint area 22 of the cage shells 6. In the case of the exemplary embodiment shown in FIGS. 1 and 2, this sealing occurs via elastomer material which also forms the bearing body 12 and which in any case covers the cage shells 6 on their circumferential surfaces. Correspondingly, in the case of the exemplary embodiment shown in FIGS. 1 and 2, the cage shells 6 are joined to a unit. The material provided in the joint area 22 is elastic, however, such that the cage shells 6 can be moved relative to each other in the radial direction in order to vary the spacing thereof. In the case of this variation of spacing, the tensile state of the bearing body 12 is varied and the sleeve bearing is calibrated correspondingly. This calibration leads, however, to no considerable deformation of the cage 4, as the cage shells 6 substantially maintain their original shape and only the elastic material deforms elastically in the joint area 22, in particular is ejected from the joint area 22. Joint surfaces 24 which lie opposite each other in the joint area 22 and are formed on the front side by the ring segment-shaped legs 20 can correspondingly be arranged with varying spacing with respect to each other for the calibration of the sleeve bearing.

Figure 3:
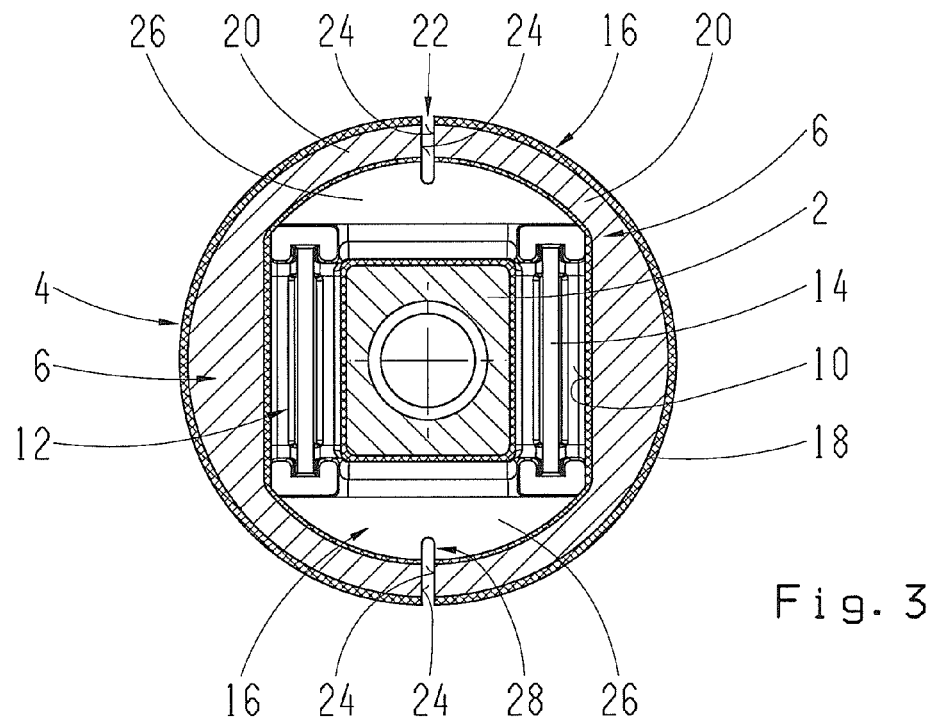
FIG. 3 is a cross-sectional view of one alternative exemplary embodiment before installation.
Figure 4:
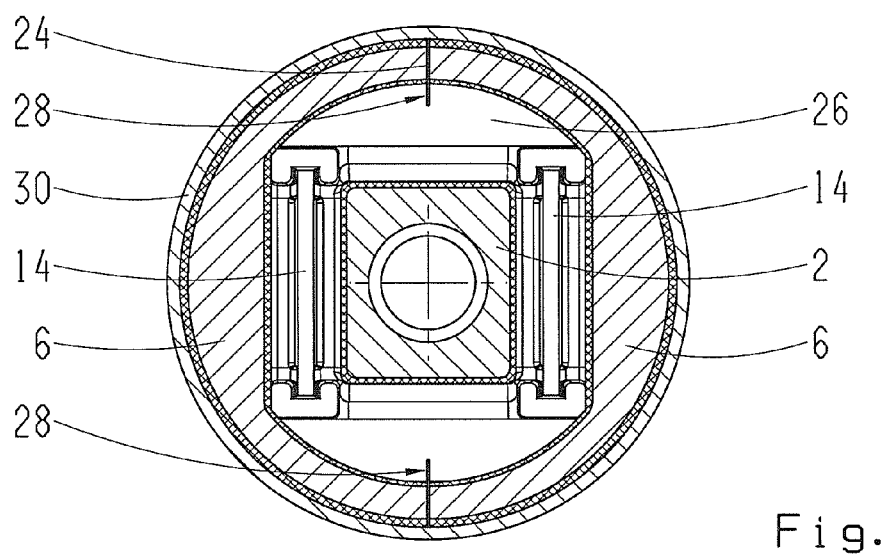
FIG. 4 is a view similar to FIG. 3 for the exemplary embodiment in the installed state.

FIGS. 3 and 4 show an alternative exemplary embodiment. The same elements are identified with the same reference numerals compared to the previously discussed exemplary embodiment.

FIGS. 3 and 4 show a cross-sectional view above a chamber cover of the chamber 16 identified in FIG. 1 with the reference numeral 26, which is formed from the elastomer material which forms the bearing body 12. The chamber cover 26 has a slot 28 in the joint area. This slot 28 is provided in the extension of the joint surfaces 24 which lie opposite each other. These joint surfaces 24 of the cage shells 6 which are formed from a hard component (metal or hard plastic) are not clad with elastomer material.

As FIG. 3 clarifies further, the coating of the cage shell 6 reaches the outer circumference, i.e. the sealing ring 18 up to the slot 28.

The installed state for the exemplary embodiment shown in FIG. 3 is clarified in FIG. 4. This shows the sleeve bearing according to FIG. 3 after installation in an outer pipe 30 and after calibration. The two cage shells 6 were moved radially onto each other such that the joint surfaces 24 now abut directly on each other. The slot 28 is pressed together correspondingly, whereby a sealing with respect to the chamber 16 occurs. At the outer circumference of the cage 4, the sealing ring 18 is formed to be closed circumferentially and abuts on the inner circumferential surface of the outer pipe 30 in a sealing manner. Correspondingly, the chambers 16 are sealed in the area of the chamber cover 26 and on the outer circumference with respect to the outer pipe 30.

Figure 5:
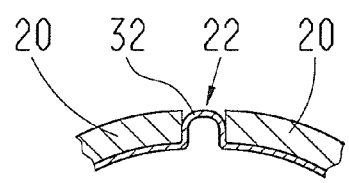
FIG. 5 is a top view of a joint area of a third exemplary embodiment of the present invention.

FIG. 5 shows a section of a further exemplary embodiment and clarifies only the sealing in the joint area 22 for this exemplary embodiment. This exemplary embodiment enables a relatively large radial mobility of cage shells 6 which lie opposite each other. These are covered with elastomer material on their inner side which forms a U-shaped fold 32 which is bent outwards between the joint surfaces 24, which lie opposite each other, of the ring segment-shaped legs 20. The fold 32 is only connected on the inner circumference to the ring segment-shaped legs 20. This is exposed between the legs 20 and correspondingly allows a relatively large mobility of the cage shells 6 in the radial direction without the sealing being lost in the circumferential direction.

REFERENCE NUMERALS

2 Inner part
4 Cage
6 Cage shell
8 Base
10 Flat contact surface
12 Bearing body
14 Intermediate sheet
16 Chamber
18 Sealing ring
20 Ring segment-shaped leg
22 Joint area
24 Joint surface
26 Chamber cover
28 Slot
30 Outer tube
32 Fold

The invention claimed is:

1. A sleeve bearing for being received in an outer sleeve, comprising:
an inner part which extends in axial direction;
a bearing body enclosing the inner part and having at least two chambers for receiving a damping agent, wherein the bearing body is made from an elastic material;
a cage which encloses the bearing body circumferentially, wherein the cage is formed from at least two cage parts, the spacing of which is able to be varied in radial direction; and
a sealed joint area provided between the cage parts by the elastic material of the bearing body being ejected between the cage parts.

2. A sleeve bearing according to claim 1, further comprising a front-side chamber cover which covers at least one of the chambers in an axial direction and seals the joint area.

3. A sleeve bearing according to claim 2, wherein the chamber cover is slotted in the joint area.

4. A sleeve bearing according to claim 1, wherein the cage parts are connected to each other and are able to move relative to each other via the elastic material.

5. A sleeve bearing according to claim 1, further comprising joint surfaces which lie opposite each other in the joint area, wherein at least one of the joint surfaces is provided with a seal.

6. A sleeve bearing according to claim 1, further comprising at least one sealing ring which encloses the cage circumferentially.

7. A sleeve bearing according to claim 1, wherein the cage parts have ring segment-shaped legs on opposite axial ends of the cage and at a height of the at least two chambers, the chambers being opposite to each other, said legs interacting in a sealing manner.

8. The sleeve bearing according to claim 1, wherein the cage parts are sealed against each other in their joint area such that hydraulic fluid contained in the sleeve bearing which serves to dampen the bearing cannot exit via the joint area.

9. A sleeve bearing for being received in an outer sleeve, comprising:
an inner part which extends in axial direction;
a bearing body enclosing the inner part and having at least two chambers for receiving a damping agent, wherein the bearing body is made from an elastic material;
a cage which encloses the bearing body circumferentially, wherein the cage is formed from at least two cage parts, the spacing of which is able to be varied in radial direction;
a sealed joint area provided between the cage parts; wherein the cage parts have or form ring segment-shaped legs on opposite axial ends and at a height of the at least two chambers which lie opposite each other, the sealed joint area being provided on free ends of the ring segment-shaped legs.

10. The sleeve bearing according to claim 9, wherein the at least two chambers are sealed in the sealed joint area.

* * * * *